Figure 1:
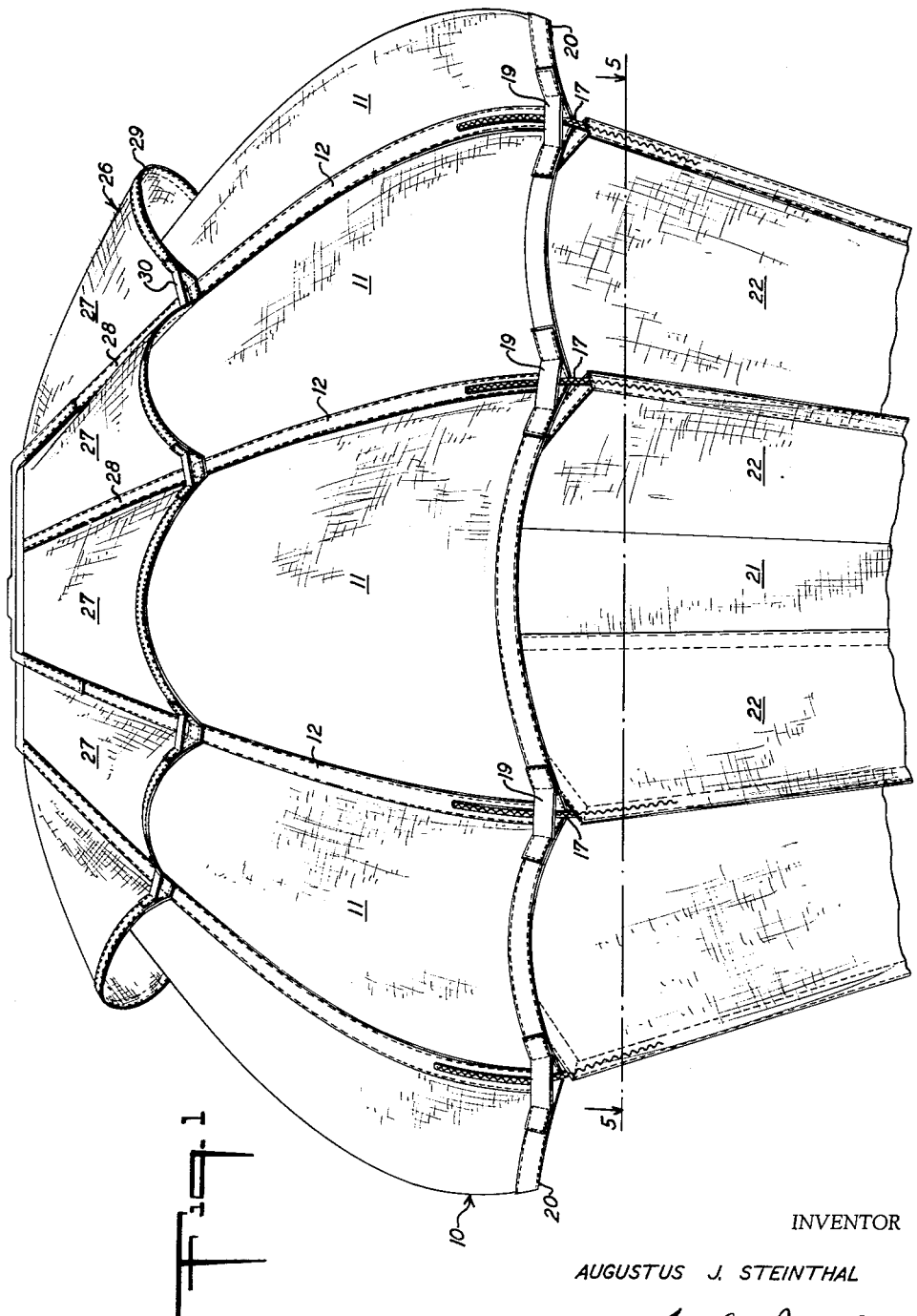

March 14, 1961 A. J. STEINTHAL 2,974,913
PILOT CHUTE WITH AUXILIARY DEPLOYMENT CANOPY
Filed June 24, 1958 5 Sheets-Sheet 1

INVENTOR
AUGUSTUS J. STEINTHAL
BY Jacobi & Jacobi
ATTORNEYS

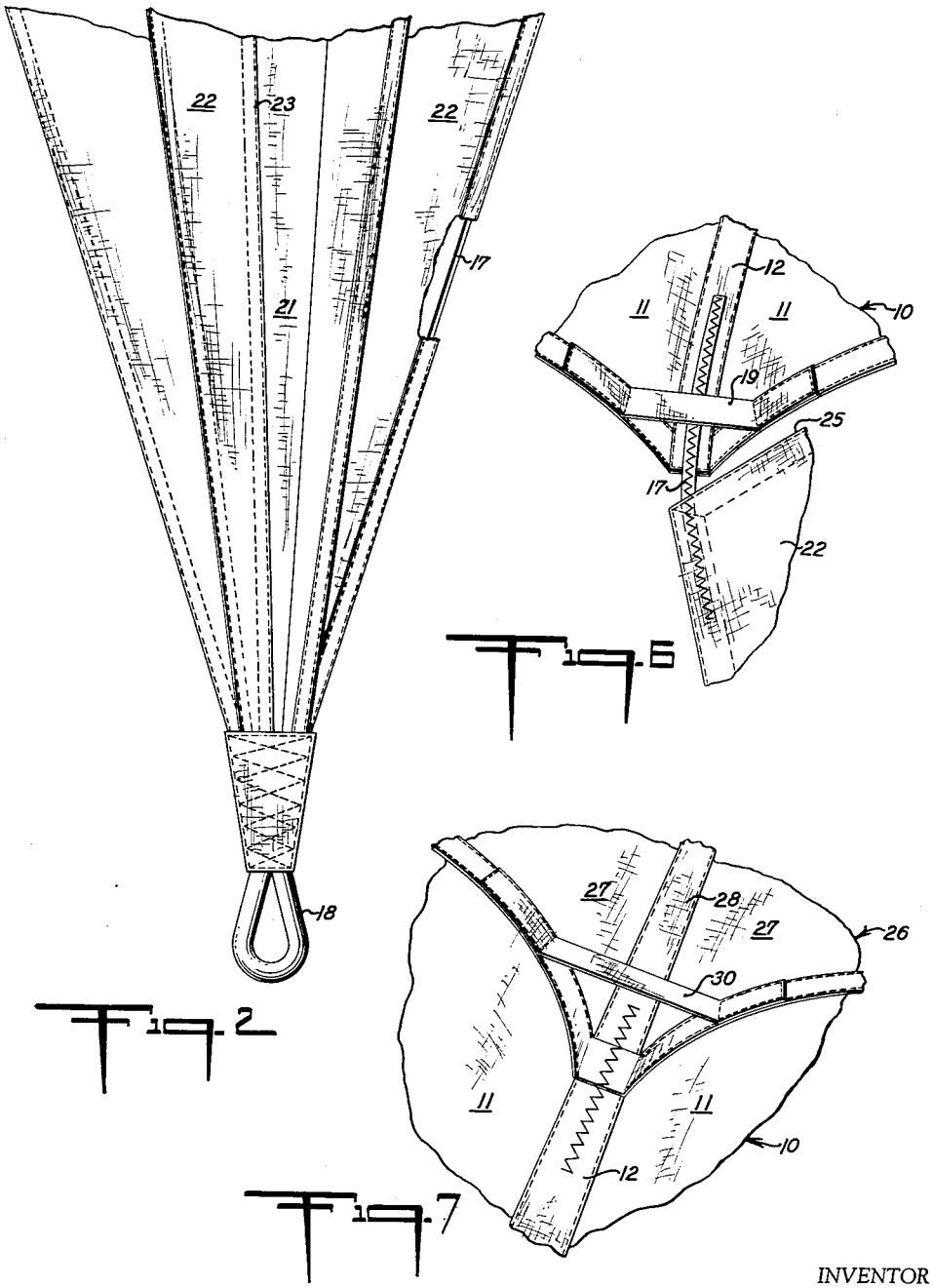

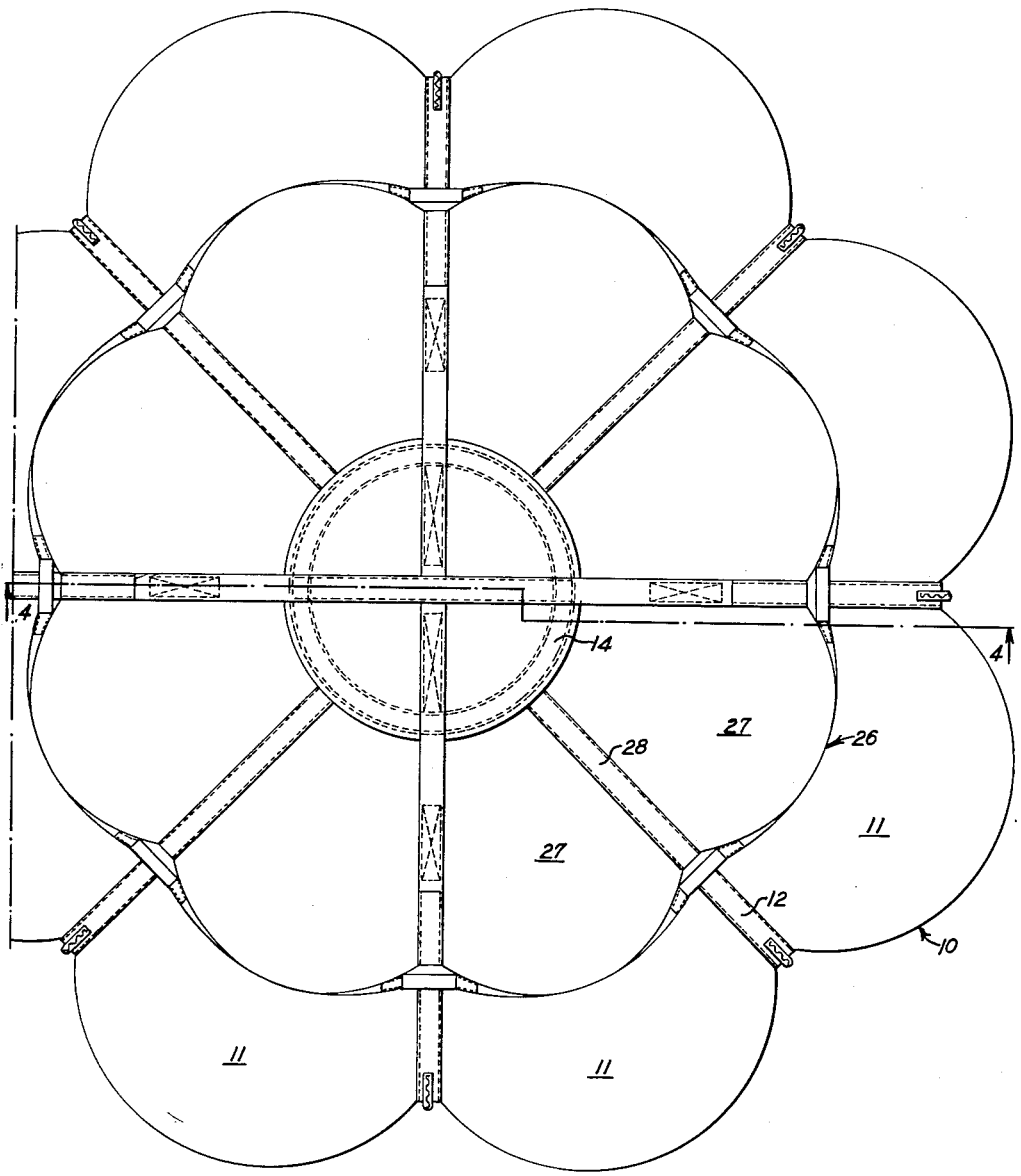

March 14, 1961  A. J. STEINTHAL  2,974,913
PILOT CHUTE WITH AUXILIARY DEPLOYMENT CANOPY
Filed June 24, 1958  5 Sheets-Sheet 4
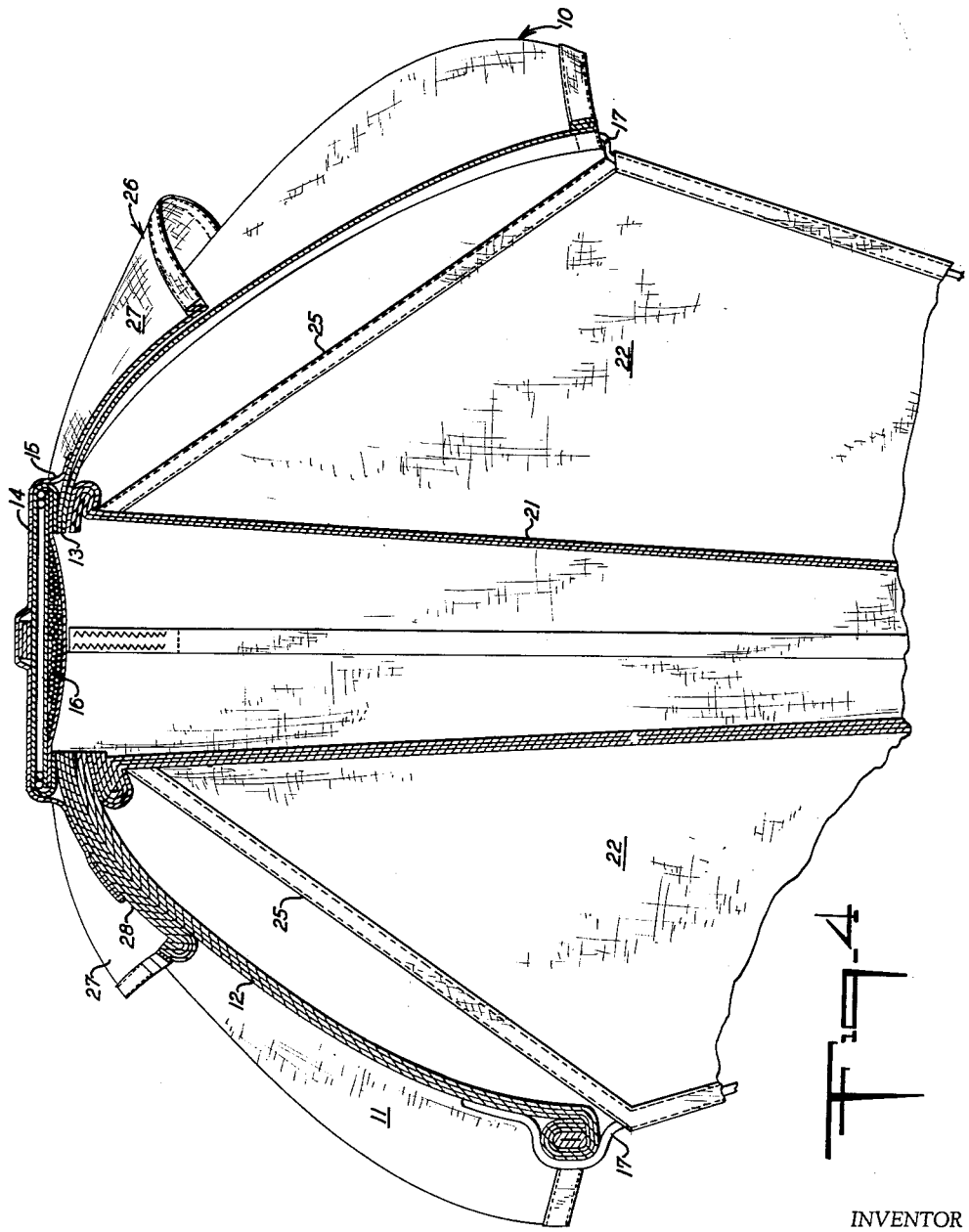
INVENTOR
AUGUSTUS J. STEINTHAL
BY *Jacobi & Jacobi*
ATTORNEYS March 14, 1961 A. J. STEINTHAL 2,974,913
PILOT CHUTE WITH AUXILIARY DEPLOYMENT CANOPY
Filed June 24, 1958 5 Sheets-Sheet 5
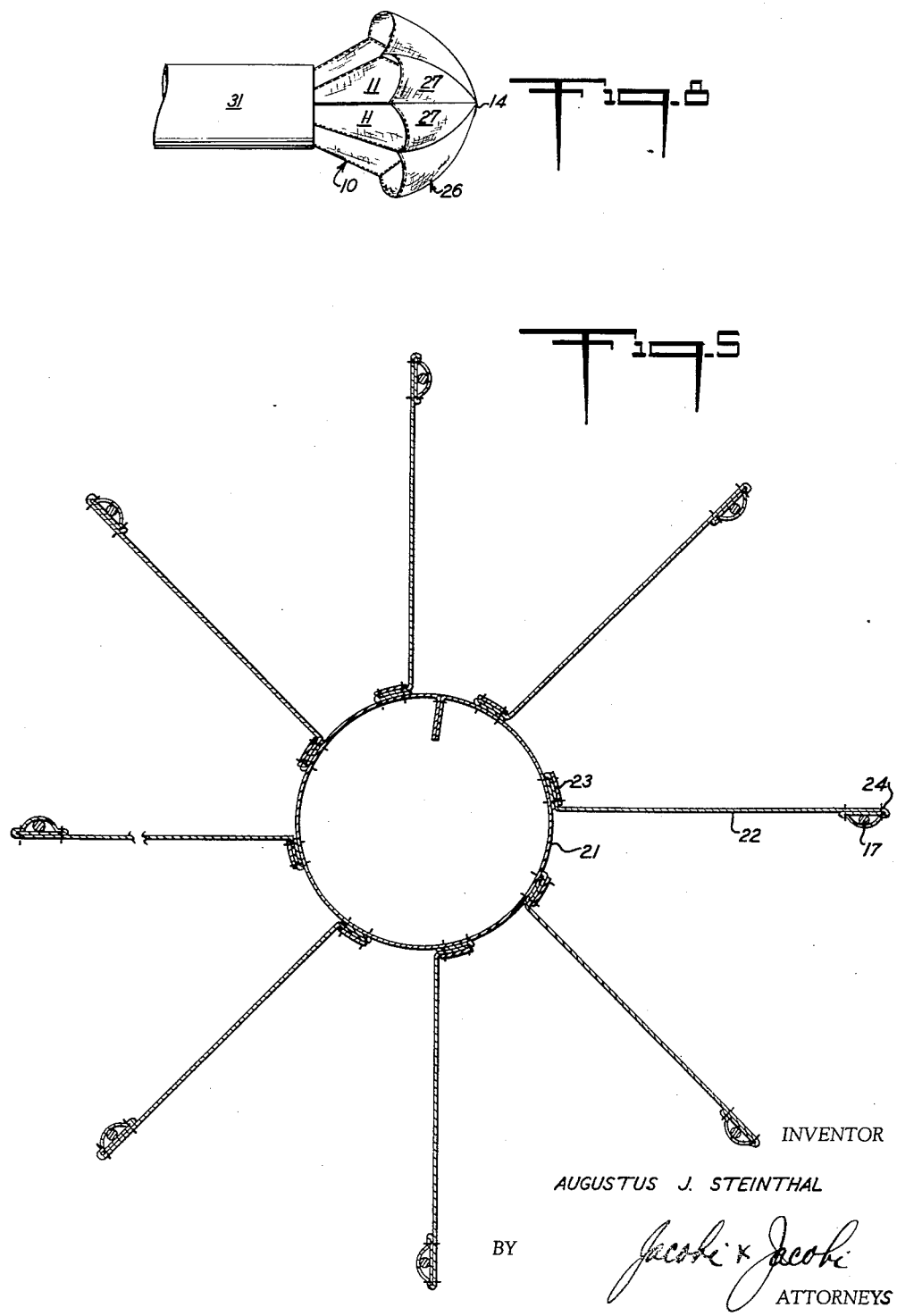
INVENTOR
AUGUSTUS J. STEINTHAL
BY
ATTORNEYS

United States Patent Office 2,974,913
Patented Mar. 14, 1961

2,974,913

PILOT CHUTE WITH AUXILIARY DEPLOYMENT CANOPY

Augustus John Steinthal, New York, N.Y., assignor to M. Steinthal & Co., Inc., New York, N.Y., a corporation of New York Filed June 24, 1958, Ser. No. 744,290

2 Claims. (Cl. 244—145)

This invention relates to aeronautics and more particularly to a pilot chute provided with an auxiliary canopy to accelerate deployment of the pilot chute upon ejection of the same from a container.

Parachute are now very commonly employed as braking means for high speed jet aircraft during landing runs and these braking or drag chutes are commonly stowed in a compartment in the aircraft, together with a pilot chute which may be stowed in the same compartment or in a separate container, which pilot chute upon release or ejection thereof from the aircraft serves to pull the main parachute from the compartment in order that the same may become inflated to provide maximum braking force.

Drag chutes cannot normally be released until the aircraft is on the ground and consequently, it is imperative that the time for release and deployment of a drag chute be maintained at a minimum and consequently numerous devices and expedients have been employed in order to accomplish this purpose, among which are ejection springs, explosive ejection devices, as well as other types of pressure operated ejection mechanisms, the primary purpose of all of these being to deploy the pilot chute into the slip stream in order that the same will inflate and pull the main parachute from the aircraft in as short a time as possible.

In order to facilitate the operation of these ejection devices, it has also been common practice to provide a weight at the apex of the pilot chute on the theory that the inertia of such weight will continue to pull the pilot chute outward after the force of the ejection mechanism has been dissipated. All of these ejection mechanisms depend for their operation on an initial ejecting force and consequently, in the event there is excessive friction between the pilot chute and the container or if for any other reason, the outward movement of the pilot chute is impeded, deployment of the same will be materially delayed with the result that the main parachute will not deploy and provide braking force in sufficient time to limit the landing run of the aircraft to a safe distance. Accordingly, a structure which will provide a continuous pull on the pilot chute after partial ejection from the container and even though the force generated by the ejecting mechanism has been dissipated will represent a step forward in the art and provide a structure which will materially accelerate ejection and deployment of a pilot chute with a consequent decrease in time required for deployment of the main parachute and this is particularly true where the auixiliary structure may be provided as part of the pilot chute without necessitating the inclusion of additional mechanical structure in the ejecting mechanism.

It is accordingly an object of the invention to provide a pilot chute having an auxiliary canopy to accelerate deployment of such pilot chute when ejected from a container.

A further object of the invention is the provision of a pilot chute of conventional construction and having an auxiliary canopy of a length less than one-half the length of the main canopy and disposed outwardly of the main canopy in order to inflate upon partial ejection of the pilot chute from a container and accelerate deployment thereof.

Another object of the invention is the provision of a pilot chute having an auxiliary canopy to facilitate and accelerate deployment thereof, the main canopy and auxiliary canopy being formed of a plurality of fabric panels joined along their side edges there being reinforcing straps extending adjacent panels and across the joints at the skirt of the main canopy, as well as at the skirt of the auxiliary canopy.

A further object of the invention is the provision of a pilot chute having an auxiliary canopy which operates to provide a continuous deployment force upon partial ejection of the pilot chute from a container or from a compartment in an aircraft.

A still further object of the invention is the provision of a pilot chute for use in aircraft in which after partial ejection from the aircraft, the deployment force is provided by the slipstream.

Further objects and advantages of the invention will be apparent from the following description taken in conjunction with the accompanying drawing wherein:

Fig. 1 is a side elevational view of an upper portion of the pilot chute constructed in accordance with this invention and showing the main canopy as well as the auxiliary canopy in inflated condition;

Fig. 2 a side elevational view with parts broken away for greater clarity and showing the lower portion of the pilot chute of Fig. 1;

Fig. 3 a fragmentary top plan view of the inflated pilot chute shown in Fig. 1;

Fig. 4 is a sectional view of the upper portion of the pilot chute taken substantially on the line 4—4 of Fig. 3;

Fig. 5 a sectional view taken substantially on the line 5—5 of Fig. 1;

Fig. 6 a fragmentary elevational view showing the reinforcing means for the skirt of the main canopy;

Fig. 7 a view similar to Fig. 6, but showing the reinforcing means for the skirt of the auxiliary canopy; and Fig. 8 a fragmentary side elevational view showing the pilot chute of this invention partially ejected from a container and with the auxiliary canopy inflated to provide a deployment force on the pilot chute.

With continued reference to the drawings, there is shown a pilot chute constructed in accordance with this invention and which may well comprise a main canopy 10 formed of a plurality of fabric panels 11 joined along their side edges by seams 12 and terminating at the apex of the canopy 10 in an opening 13. A cap 14 is secured to the canopy 10 by suitable straps 15 or other securing means and the cap 14 serves to close the opening 13 at the apex of the canopy 10. Lead shot 16 or other suitable means may be incorporated in the cap 14 to add weight thereto, thereby facilitating ejection of the pilot chute from a container or a compartment in an aircraft. The weight serving to provide inertia to assist in deployment of the pilot chute.

Shroud lines 17 are secured to the skirt of the main canopy 10 at the seams 12 between the panels 11 and the shroud lines 17 extend downwardly and terminate in bridle attachment means 18, as shown in Fig. 2. A suitable bridle is attached to the means 18 and in turn is attached to the main parachute which is pulled from the compartment in the aircraft by the pilot chute of this invention. Reinforcing tapes 19 extend between adjacent panels 11 across the seams 12 at the skirt 20 of the main canopy 10 and as shown in Fig. 1, when the main canopy 10 is inflated, the tapes 19 provide reinforcing means which operates to prevent separation of the seams 12 at the skirt 20.

As best shown in Figs. 1, 4 and 8, a fabric cone 21 extends between the attachment means 18 and the apex of the main canopy 10 and is secured to the main canopy 10 surrounding the opening 13. The fabric cone 21 serves to assist the shroud lines 17 in transmitting load from the attachment means 18 to the main canopy 10. A plurality of radially disposed generally triangular fabric veins 22 are secured along their inner edges 23 to the cone 21 and along their outer edges 24 to the shroud lines 17. The upper edges 25 of the veins 22 are spaced below the main canopy 10 when in inflated condition, as clearly shown in Fig. 4. These veins 22 operate to stabilize the pilot chute when in use.

An auxiliary canopy 26 may be formed of a plurality of auxiliary fabric panels 27, these panels 27 being less than one-half the length of the panels 11 of the main canopy 10, as clearly shown in Figs. 1 and 4. The auxiliary panels 27 forming the auxiliary canopy 26 are disposed over the panels 11 on the main canopy 10, the panels 27 being secured to each other by seams 28 along their side edges and to the seams 12 of the main canopy 10. The auxiliary panels 27 between the seams 28 are free from the panels 11 of the main canopy 10, as clearly shown in Figs. 1 and 4. The auxiliary panels 27 forming the auxiliary canopy 26 terminate at the opening 13 as shown in Fig. 4.

In order to reinforce the skirt 29 of the auxiliary canopy 26, there may be provided reinforcing tapes 30 extending between the panels 27 and across the seams 28 at the skirt 29. The tapes 30 operate to absorb a portion of the strain at the skirt 29 when the auxiliary canopy 26 is inflated thereby preventing separation of the panels 27 along the seam 28.

With particular reference to Fig. 8, the pilot chute of this invention may be stowed aboard the aircraft in a container 31 or any other suitable compartment in the aircraft and upon operation of the pilot chute ejection mechanism, the pilot chute will be partially ejected from the container 31, as clearly shown in Fig. 8, with the result that the auxiliary canopy 26 will be exposed to the slip stream and thereby inflated, which will operate to provide sufficient force to pull the main canopy 10 from the container 31, whereupon the main canopy 10 will inflate and pull the main parachute from the compartment in the aircraft. In this way, it is not necessary to provide an ejecting mechanism which will operate to eject the entire pilot chute from the container 31, but it is only necessary to partially eject the pilot chute therefrom to the extent necessary to expose the auxiliary canopy 26 to the slipstream, whereupon the pilot canopy will provide the force necessary to withdraw the remainder of the pilot chute from the container 31. It is, therefore, apparent that a continuous force tending to withdraw the pilot chute from the container 31 will be applied, even though the force exerted by the ejecting mechanism is insufficient to cause complete ejection of the pilot chute and furthermore, the inflation of the auxiliary canopy will operate to overcome any undue frictional or other resistance to removal of the pilot chute from the container or other compartment in the aircraft.

It will, therefore, be seen that by the above described invention there has been provided a relatively simple, yet highly efficient means for insuring positive withdrawal or ejection of a pilot chute from the compartment or container of the aircraft and at the same time, provide means for accelerating deployment of the pilot chute thereby accelerating deployment of the main parachute and providing a braking force or drag at the earliest possible moment after landing of the aircraft.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:
1. A pilot chute comprising a main canopy formed of a plurality of fabric panels joined along their side edges and terminating at the apex of said canopy in an opening, a weighted cap attached to said canopy and closing said opening to facilitate ejection of said chute from a container, shroud lines secured to the skirt of said canopy at the joint between adjacent panels and terminating in bridle attachment means, reinforcing tapes extending between adjacent panels across the joint at the skirt, a fabric cone extending between said attachment means and said canopy and secured to said canopy surrounding said opening, a plurality of radially disposed generally triangular fabric vanes secured along their inner edges to said cone and along their outer edges to said shroud lines, the upper edges of said vanes being spaced below said canopy when inflated and an auxiliary canopy comprising a plurality of auxiliary fabric panels less than one-half the length of the panels of said main canopy, said auxiliary panels being disposed over the panels of said main canopy and secured to said main canopy along the joints between the panels of said main canopy, said auxiliary panels terminating at said opening and reinforcing tapes extending between adjacent auxiliary panels across the joint at the skirt of said auxiliary canopy whereby upon partial ejection of said chute from a container said auxiliary canopy will inflate to pull the remainder of said chute from said container thereby accelerating pilot chute deployment.

2. A pilot chute comprising a main canopy formed of a plurality of fabric panels joined along their side edges and terminating at the apex of said canopy in an opening, a weighted cap attached to said canopy and closing said opening to facilitate ejection of said chute from a container, shroud lines secured to the skirt of said canopy at the joint between adjacent panels and terminating in bridle attachment means, a fabric cone extending between said attachment means and said canopy and secured to said canopy surrounding said opening, a plurality of radially disposed generally triangular fabric vanes secured along their inner edges to said cone and along their outer edges to said shroud lines, the upper edges of said vanes being spaced below said canopy when inflated and an auxiliary canopy comprising a plurality of auxiliary fabric panels less than one-half the length of said main panel, said auxiliary panels being disposed over the panels of said main canopy and secured to said main canopy along the joints between the panels of said main canopy, said auxiliary panels terminating at said opening, whereby upon partial ejection of said chute from a container said auxiliary canopy will inflate to pull the remainder of said chute from said container thereby accelerating pilot chute deployment.

References Cited in the file of this patent

UNITED STATES PATENTS

| | | |
|---|---|---|
| 1,776,629 | Kugler | Sept. 23, 1930 |
| 1,872,705 | Elliott | Aug. 23, 1932 |
| 2,299,408 | Quilter | Oct. 20, 1942 |
| 1,513,867 | Heffernan | July 4, 1950 |

OTHER REFERENCES

U.S. Department of Agriculture Forest Service Equipment Development, Report No. 41, pages 4, 5 and 12, July 1956.